United States Patent
Vissers

[15] 3,670,670
[45] June 20, 1972

[54] HARROWS

[72] Inventor: Herbert Vissers, Nieuw-Vennep, Netherlands

[73] Assignee: Landbouwwerktuigenen Machinefabriek H. Vissers N.V., Nieuw-Vennep, Netherlands

[22] Filed: June 5, 1970

[21] Appl. No.: 41,780

Related U.S. Application Data

[63] Continuation of Ser. No. 741,944, July 2, 1968, abandoned.

[52] U.S. Cl. .................................. 111/10, 111/86, 172/102
[51] Int. Cl. ................... A01c 7/08, A01c 5/00, A01b 33/16
[58] Field of Search ...................... 111/52, 7, 11, 84, 86, 10; 172/102, 53

[56] References Cited

UNITED STATES PATENTS

| | | |
|---|---|---|
| 2,658,463 | 11/1953 | Jaeger .................................. 111/86 |
| 147,874 | 2/1874 | Smith .................................. 111/11 |
| 965,200 | 7/1910 | Larson .............................. 172/102 X |
| 3,177,828 | 4/1965 | Cramer ................................ 111/52 |
| 3,186,495 | 6/1965 | Gijzenberg ......................... 172/102 |
| 3,413,940 | 12/1968 | Vissers .......................... 172/102 X |

FOREIGN PATENTS OR APPLICATIONS

| | | |
|---|---|---|
| 1,091,104 | 11/1967 | Great Britain ........................... 111/7 |
| 419,620 | 10/1925 | Germany ............................ 172/102 |

Primary Examiner—Robert E. Pulfrey
Assistant Examiner—Stephen C. Pellegrino
Attorney—Snyder and Butrum

[57] ABSTRACT

The invention relates to a harrow having one or more transversely reciprocating teeth carrying beams and further having a device for sowing seeds. The teeth of said reciprocating harrow beam or beams are each provided or united with a channel extending longitudinal of the tooth and said channel at its upper end is connected to a seed supply and has at or near its lower end an outlet.

8 Claims, 4 Drawing Figures

PATENTED JUN 20 1972

3,670,670

INVENTOR

HERBERT VISSERS

BY *Tausig & Smiley*

ATTORNEYS

HARROWS

This is a continuation of application Ser. No. 741,944, filed July 2, 1968, now abandoned.

This invention relates to a harrow having at least one transversely reciprocating teeth-carrying beam provided with a drive and having a device for sowing seeds.

Harrows of this kind present the advantage that with a single passage of the harrow the ground is cultivated and seed is sown, so that said operations are obtained more rapidly and therefore at lower costs and further the texture of the soil is less affected by driving on the field.

With known harrows of this kind the sowing device is arranged in front of the harrow beams and for delivering the seed into the ground seeding coulters are provided, which, however, should be movable in vertical direction in order to prevent the coulters from displacing in front of them remaining parts of roots and plants and to allow the coulters to pass over unevennesses of the ground and clods of soil.

Said known harrows should further be provided with an element such as a roller or a trailing member for closing the furrows cut by the coulters and into which the seed is dropped. Harrows of this kind are therefore heavy and moreover after some time clearance occurs in the pivotal suspension of the seeding coulters, whereby the coulters start to swing.

The invention has for its object to improve said known harrows, so that the above mentioned drawbacks are removed. According to the invention the teeth of the reciprocating harrow beam or beams are each provided or united with a channel extending in longitudinal direction of the tooth and said channel at its upper end is connected to a seed supply and has at or near its lower end an outlet. With this arrangement the harrow teeth themselves deliver the seed into the ground to the desired depth, and thus the sowing device is simplified and no additional means are required for closing the soil after the introduction of seed.

As the seed receiving teeth of the harrow according to the invention are connected to a drive for transversely reciprocating said teeth, the teeth will shake off remaining parts of roots and plants so that said parts will not be moved forwards in the direction of travel of the harrow. By the transversely reciprocating movement of the harrow teeth with a stroke of about 24 inches a spreading of the seed on the field is obtained which is somewhat comparable to that obtained when broadcast sowing, as the seed is sown in zigzag rows. Such broadcast sowing presents the advantage that the crop when subjected to strong wind and heavy fall of rain has less tendency to lie down and is therefore more easily mowed. Broadcast sowing, however, has the drawback that the seed is irregularly spread on the field and moreover the seed is urged into the ground by a harrowing operation and the seed do not come to rest at the same depth in the ground. With the arrangement according to the invention the seed receiving harrow teeth all may have their outlet opening for the seed at the same distance from the lower end of the teeth, and the drawback of broadcast sowing is removed and the depth of the seed in the ground will be very uniform. Further said teeth all may be connected to their individual distributing means so that the spreading of the seed on the field will be very uniform.

As the receiving teeth of the harrow according to the invention are carried by a transversely reciprocating beam the further advantage is obtained that the number of teeth required may be smaller than that of the seeding coulters of the known harrows, and yet the spreading of the seed on the field is more uniform, so that the seed uniformly germinates and the plants equally grow. The reduced number of teeth requires less power and reduces the weight of the device, so that the texture of the soil is affected to a smaller degree.

The sowing device according to the invention further presents the advantage over broadcast sowing that the wind has no influence on the seed, so that the farmer is less dependent on the weather and may put the seed in the ground earlier in the year.

With the harrow according to the invention harrowing, sowing and closing the soil are obtained in a single operation of the harrow, as the ground behind the transversely reciprocating teeth which bring the seed in the ground, immediately closes itself, so that the soil is not unnecessarily dried. The moisture contained in the soil is therefore better used and said advantage is of particular importance in a tropical climate.

The more uniform distribution of the seed on the zigzag rows in the ground as obtained with the harrow according to the invention further presents the advantage that light and heat may better reach the seed and the young plants so that the germination of the seed and the growth of the plants are furthered and therefore a larger crop will be obtained.

For adjusting the depth of the seed below the surface of the ground the harrow beam carrying the seed receiving teeth according to the invention may be adjustable in a vertical direction. By adjusting said beam with respect to the frame and therefore with respect to the other beams in a downward direction the outlet opening of the teeth for the seed will be deeper in the ground. The uniformity of the depth of the seed in the ground below the surface may still be improved by arranging below the beam carrying the seed receiving teeth a rubbing plate and locating said plate above the outlet openings of the teeth for the seed. Said harrow beam if desired may be adjustable in a vertical direction with respect to said rubbing plate. Also the rubbing plate could be adjustable in vertical direction with respect to the outlet opening of the teeth for the seed.

Preferably the outlet opening for the seed at the rear of the hollow teeth are located at the level of the point of the tooth or closely above said level and conveniently at the rearmost beam of the harrow having a plurality of beams.

The adjustment of the outlet opening of the teeth for the seed makes it possible to bring the seed exactly on the right depth in the ground and precisely on or below the separation between the humid and dry soil, whereby the moisture in the ground is more usefully employed for a rapid germination of the seed and growth of the plants. Also the adjustment of the rubbing plate in a vertical direction with respect to the outlet openings of the teeth for the seed contributes to said result.

The invention will be further described with reference to the accompanying drawings in which an example of a harrow provided with a sowing device according to the invention is diagrammatically illustrated. In the drawings.

Figure 1:
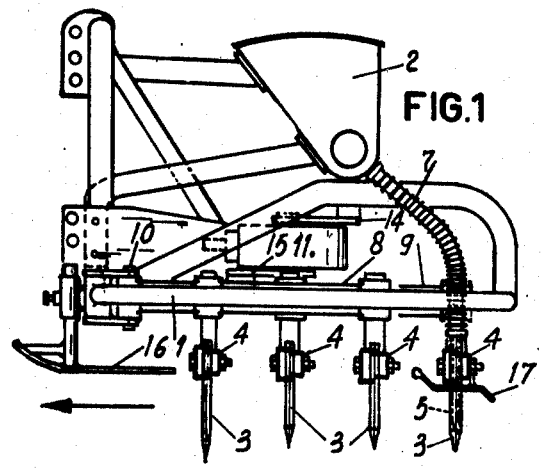
FIG. 1 is a side view of the harrow.
Figure 4:
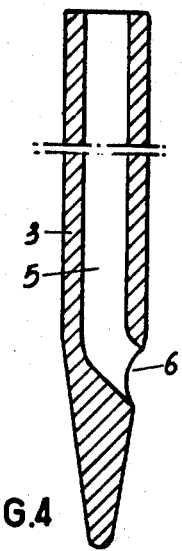
FIG. 4 is a sectional elevation of a hollow tooth to which the seed is supplied.
Figure 2:
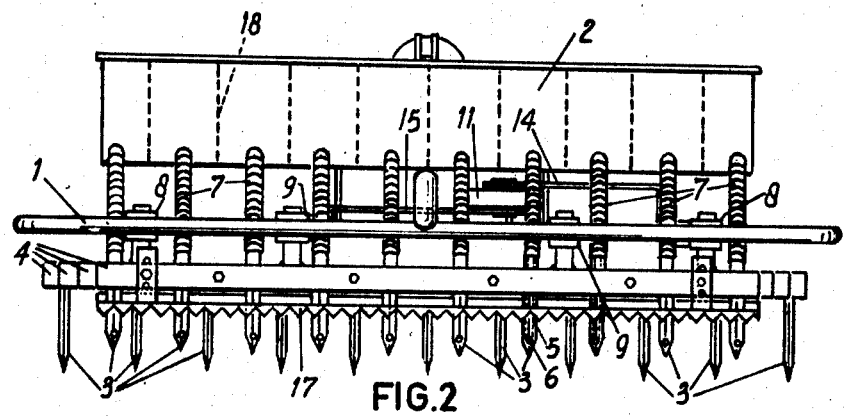
FIGS. 2 and 3 are a rear view and a plan view respectively of the harrow shown in FIG. 1.
Figure 3:
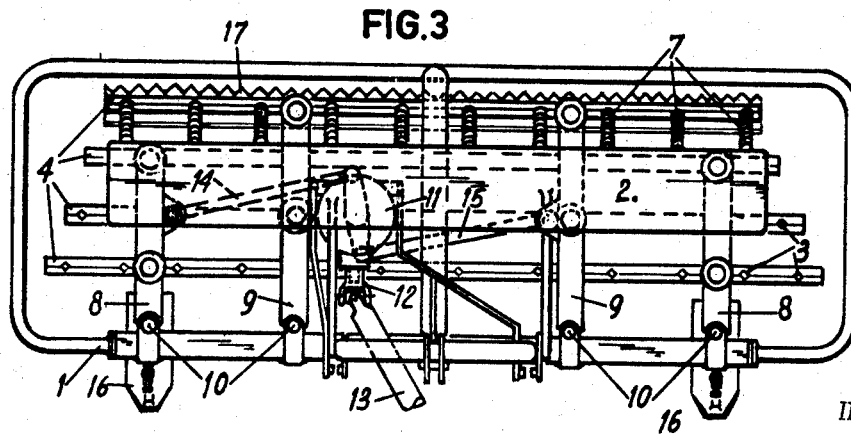

The frame 1 carries a storage receptacle 2 containing the seed to be sown. The frame further carries four teeth carrying beams 4 carrying teeth 3, the teeth of the rearmost beam being hollow and each including a cavity 5 terminating at the rear of the teeth in an outlet opening 6. The hollow teeth 3 at their upper end are connected by flexible conduits 7 to the outlets of the receptacle 2. Said receptacle by means of partitions 18 may be divided into compartments one for each tooth, and comprising means (not shown) ensuring that each tooth receives a substantially equal quantity of seed.

The beams 4 are suspended by levers 8 and 9 which each have a vertical pivot 10 at the frame 1. For reciprocating the beams 4 a pair of cranks 11 are provided and said cranks through the intermediary of a gear not shown in the drawing are driven by a shaft 12 receiving its rotation from a coupling shaft 13 of the take-off shaft of a tractor (not shown). The connecting rod 14 drives the outer levers 8 connected to the foremost and the third beam 4 and the connecting rod 15 drives the levers 9 connected to the second and the rearmost beam 4. For vertically adjusting the frame 1 with respect to the ground adjustable guide shoes 16 are provided which enables the beam carrying the seed receiving teeth to be vertically adjusted with respect to the other beams. 17 denotes a rubbing plate arranged at the rearmost beam 4 carrying the hollow teeth 3. If desired the plate 17 at its rear side may be dentated. Rubbing plate 17 is suspended from the rearmost beam 4 by a pair of straps 20 each of which has the lower end thereof secured to the rubbing plate. These straps each have three holes 22 formed therethrough for receiving bolts 24 received by suitable holes in the associated beam. This arrangement permits the rubbing plate to be vertically adjusted with respect to the outlet openings in the teeth by inserting the bolts 24 through different ones of holes 22. Rubbing plate 17 compresses the upper layer of the ground and produces uniformity of such upper layer.

It is to be noted that the teeth 3 of the rearmost beam 4 which bring the seed into the ground, need not to be hollow as a solid tooth may be provided at its rear with a channel or a pipe. Further the harrow described above may also be arranged for delivering fertilizers in the ground and to this end one of the other beams may be provided with hollow teeth connected to a supply of liquid ammonia, for example, and said teeth at or near their lower end being provided with an outlet opening for the ammonia.

It is finally noted, that the seed receiving teeth may also be used in a harrow, having its teeth secured to horizontal transverse carriers, each of which are secured to a transversely extending beam by means of a longitudinally extending rod.

What is claimed is:

1. Apparatus for sowing seed in buried condition at a substantially uniform and selected depth below the ground surface and in zig-zag row pattern, said apparatus comprising, in combination:

a frame adapted to be moved over the ground surface along a selected path;

means for supporting said frame at a selected level above the ground surface as it is moved along said path;

a plurality of teeth carried by said frame and depending therefrom to distances greater than said selected level whereby tip portions of said teeth project into the ground, each of said teeth having a rearwardly directed seed discharge opening in its tip portion and all of said seed discharge opening being located in a substantially common horizontal plane located at said selected depth at which seed is to be buried, each tooth also having a seed-guiding channel therein leading downwardly to a corresponding seed discharge opening;

seed supply means carried by said frame above said teeth and including seed guiding means communicating with upper portions of said channels whereby seed flows by gravity from said seed supply means, through said channels and out through said seed discharge openings at said selected depth; and drive means for moving said teeth back and for transverse to said path as said frame is moved along such path so that (1) seed is sown in zig-zag row pattern at said selected depth and (2) the ground soil automatically fills in and buries seed at said selected depth.

2. Sowing apparatus as defined in claim 1 wherein each of said teeth is connected to an individual distributing means operatively associated with said seed supply.

3. Sowing apparatus as defined in claim 1 including a rubbing plate supported by said frame adjacent said teeth and being located above the seed outlets thereof.

4. Sowing apparatus as defined in claim 3 wherein said rubbing plate is vertically adjustable with respect to the seed outlets of said teeth.

5. Apparatus as defined in claim 1 including a plurality of transversely extending beams provided in spaced generally parallel relationship with one another and being movably supported by said frame, each of said beams carrying depending teeth, said drive means being adapted to transversely reciprocate said beams, said beams including a leading beam which is forwardmost of said beams and a trailing beam disposed rearwardly of said forwardmost beam in relation to said path along which the frame is adapted to move, said teeth including means defining channels being carried by said trailing beam.

6. A harrow comprising a frame, a plurality of transversely extending teeth carrying beams provided in spaced generally parallel relationship with one another and movably supported by the frame, each of said beams carrying depending teeth, drive means supported by the frame and operatively connected to said beams for transversely reciprocating said beams, said harrow being movable in a direction so as to define a leading beam which is forwardmost of said beams and a trailing beam disposed rearwardly of said forwardmost beam, the teeth of said trailing beam each including means defining a channel extending longitudinally of the associated tooth, a seed supply supported by said frame and being connected with an upper portion of each of said channels, each of said channels defining an outlet at the lower end thereof for sowing seeds, a rubbing plate being supported by said trailing beam, said plate being located above the outlets of said channels, said rubbing plate being provided with teeth on the rear side thereof.

7. A harrow as claimed in claim 6 wherein said plate includes a central generally planar portion, said teeth being directed obliquely to the rear with respect to said planar portion.

8. A method of sowing seeds comprising feeding seeds downwardly by gravity through channels associated with a plurality of teeth, said channels terminating in rearwardly facing seed outlets at their lower ends and being positioned beneath the surface of the ground, maintaining said seed outlets at a selected depth below the ground surface, moving said teeth through the ground in a forward direction while feeding said seeds downwardly by gravity, and simultaneously moving said teeth back and forth in a direction transverse to said forward direction to thereby sow seeds into the ground beneath the surface thereof in a generally zig-zag pattern and at said selected depth.

* * * * *